Patented Sept. 9, 1930

1,775,548

UNITED STATES PATENT OFFICE

CHARLES EVERETT BILLS, OF EVANSVILLE, INDIANA, ASSIGNOR TO MEAD JOHNSON & COMPANY, OF EVANSVILLE, INDIANA, A CORPORATION OF INDIANA

PROCESS OF PURIFYING ERGOSTEROL

No Drawing. Original application filed April 9, 1928, Serial No. 268,791. Divided and this application filed April 15, 1929. Serial No. 355,440.

This invention relates to the processes of purifying ergosterol.

This application is a division of my copending application, Serial No. 268,791, filed April 9, 1928, covering my invention in processes of preparing ergosterol.

The process of purifying ergosterol which is set forth, described, and claimed herein may be used to purify crude ergosterol prepared by the method disclosed in my said copending application or may be used to purify ergosterol made by methods other than that referred to.

The main object of the present invention is to improve the art of refining ergosterol, to the end that substantially pure ergosterol, free from other lipoids and sterols, may be produced.

Another object is to device a method whereby the desired result may be attained with a minimum of expense and manipulation of the crude ergosterol.

To appreciate my invention it should be understood that ergosterol is a sterol that occurs in minute amounts in a wide variety of vegetable and animal tissues. It is usually found in association with other lipoids, especially with other sterols, and when prepared from the customary raw material, for example, from the fatty matter of fungi, it is almost always contaminated with said sterols and lipoids. Such contaminated ergosterol is extremely difficult to purify by crystallization from ordinary solvents. The reason for this appears to be that the contaminants tend to crystallize out with the ergosterol when the usual sterol solvents, such as alcohol, acetone, ether, benzene, etc., are employed. Sometimes the use of these solvents will effect a partial purification by the removal of pigments and other freely soluble impurities, but the ergosterol so obtained, although it may look colorless and crystalline, nevertheless remains impure, as may be shown by a determination of its specific rotation.

My process of purifying ergosterol consists in employing a mixture of acetone and ethyl ether as a solvent for the crystallization of the ergosterol. By a systematic study of many individual solvents and solvent mixtures I have discovered that acetone-ether mixtures permit an exceptionally rapid growth of ergosterol crystals, the crystals being not only large and perfect, but distinctly less contaminated than when other solvents are used.

In practicing my invention I dissolve ergosterol in a mixture of acetone and ether at or near the boiling point, then allow the solution to cool, and then collect the crystals and work up the mother liquor in the usual manner familiar to chemists. Preferably the mixture is composed of three volumes of acetone and one volume of ether, but variations from this proportion are to be understood as included in my invention. Ordinarily I use about 50 cc. of the solvent mixture for each gram of ergosterol, but more or less concentrated solutions may be employed if desired. Sometimes it is advantageous to collect and separate the ergosterol crystals from the mother liquor just as soon as they are formed in sufficient yield, thereby avoiding contamination by the precipitate of other sterols that may form on long standing.

One or two recrystallizations of crude ergosterol from my acetone-ether mixture generally suffices to give an ergosterol so pure that its specific rotation in chloroform will be —120° for sodium light, and a few repetitions of the treatment produce ergosterol of extreme purity, the specific rotation being —132°. As a specific example, in order to illustrate my invention, the following may be cited:—100 grams of crude ergosterol (specific rotation for sodium light being —111° in chloroform) were dissolved in 5 liters of a boiling mixture consisting of three volumes of acetone and one volume of ethyl ether. The solution was cooled to 0° C., and the crystals obtained were then recrystallized three times more in the same manner. The final product exhibited a specific rotation of —131°, and was therefore of excellent purity. The final yield, excluding second crops, amounted to 60 grams.

I claim as my invention:—

1. An improvement in the process of purifying ergosterol which consists in crystallizing ergosterol from a mixture of acetone and ether.

2. An improvement in the process of purifying ergosterol which consists in using a mixture of acetone, three parts by volume, and ether, one part by volume, as a solvent for crystallization of the ergosterol.

3. The process of purifying ergosterol which consists in crystallizing the ergosterol from a mixture of acetone and ether, collecting the crystals, and subjecting the same to re-crystallization.

4. The process of purifying ergosterol which consists in crystallizing the ergosterol from a mixture of acetone and ether in the proportion of three parts by volume of acetone and one part by volume of ether, collecting the crystals, and subjecting the same to re-crystallization.

5. An improvement in the process of purifying ergosterol which consists in crystallizing ergosterol from a mixture of acetone and ether and collecting the crystals promptly after they have been formed and before precipitation of other sterols occurs.

6. An improvement in the process of purifying ergosterol which consists in using a mixture of acetone, three parts by volume, and ether, one part by volume, as a solvent for crystallization of the ergosterol, and collecting the crystals promptly after they have been formed and before precipitation of other sterols occurs.

7. An improvement in the process of purifying ergosterol which consists in crystallizing ergosterol from a mixture of acetone and ether, collecting the crystals promptly after they have been formed and before precipitation of other sterols occurs and subjecting the crystals to re-crystallization.

8. An improvement in the process of purifying ergosterol which consists in using a mixture of acetone, three parts by volume, and ether, one part by volume, as a solvent for crystallization of the ergosterol, collecting the crystals promptly after they have been formed and before precipitation of other sterols occurs and subjecting the crystals to re-crystallization.

9. An improvement in the process of purifying ergosterol which consists in crystallizing ergosterol from a mixture of acetone and ether as a solvent, using approximately 50 cc. of solvent to one gram of ergosterol.

10. An improvement in the process of purifying ergosterol which consists in using a mixture of acetone, three parts by volume, and ether, one part by volume, as a solvent for crystallization of the ergosterol, using approximately 50 cc. of the solvent to one gram of ergosterol.

11. An improvement in the process of purifying ergosterol which consists in crystallizing ergosterol from a mixture of acetone and ether as a solvent, using approximately 50 cc. of solvent to one gram of ergosterol, collecting the crystals and subjecting the same to re-crystallization.

12. An improvement in the process of purifying ergosterol which consists in using a mixture of acetone, three parts by volume, and ether, one part by volume, as a solvent for crystallization of the ergosterol, using approximately 50 cc. of the solvent to one gram of ergosterol, collecting the crystals and subjecting the same to re-crystallization.

In testimony, that I claim the foregoing as my invention, I affix my signature, this 8th day of April, 1929.

CHARLES EVERETT BILLS.